(12) United States Patent
Chen et al.

(10) Patent No.: US 7,246,306 B2
(45) Date of Patent: Jul. 17, 2007

(54) WEB INFORMATION PRESENTATION STRUCTURE FOR WEB PAGE AUTHORING

(75) Inventors: Jinlin Chen, Pittsburgh, PA (US); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 10/177,803

(22) Filed: Jun. 21, 2002

(65) Prior Publication Data

US 2004/0205513 A1    Oct. 14, 2004

(51) Int. Cl.
*G06N 3/00*    (2006.01)

(52) U.S. Cl. .................................................. 715/501.1

(58) Field of Classification Search ............. 715/501.1, 715/517, 513, 760, 523, 530
See application file for complete search history.

(56) References Cited

U.S. PATENT DOCUMENTS

| | | | |
|---|---|---|---|
| 5,537,526 A | 7/1996 | Anderson et al. | |
| 5,704,029 A | 12/1997 | Wright | |
| 6,023,714 A | 2/2000 | Hill et al. | |
| 6,230,174 B1 | 5/2001 | Berger et al. | |
| 6,300,947 B1 | 10/2001 | Kanevsky | |
| 6,345,279 B1 | 2/2002 | Li et al. | |
| 6,556,217 B1 | 4/2003 | Makipaa et al. | |
| 6,564,263 B1 | 5/2003 | Bergman et al. | |
| 6,573,907 B1 | 6/2003 | Madrane | |
| 6,785,676 B2 | 8/2004 | Oblinger | |
| 2001/0054046 A1* | 12/2001 | Maeda et al. ............... | 707/517 |
| 2002/0099826 A1 | 7/2002 | Richards et al. | |
| 2002/0156807 A1* | 10/2002 | Dieberger ................. | 707/501.1 |
| 2003/0005159 A1* | 1/2003 | Kumhyr ..................... | 709/246 |
| 2003/0037076 A1* | 2/2003 | Bravery et al. ............. | 707/517 |
| 2003/0095135 A1* | 5/2003 | Kaasila et al. ............... | 345/613 |
| 2003/0101203 A1* | 5/2003 | Chen et al. ................. | 707/513 |
| 2004/0085341 A1 | 5/2004 | Hua et al. | |
| 2004/0086046 A1 | 5/2004 | Ma et al. | |
| 2004/0088726 A1 | 5/2004 | Ma et al. | |
| 2004/0187080 A1 | 9/2004 | Brooke et al. | |
| 2005/0108637 A1 | 5/2005 | Sahota et al. | |

OTHER PUBLICATIONS

"Refreshable Braille Displays," Mar. 11, 2000, <http://web.archive.org/web/20000311151437/http://www.deafblind.com/display.html>, pp. 1-2.*

(Continued)

*Primary Examiner*—Stephen Hong
*Assistant Examiner*—Kyle R. Stork
(74) *Attorney, Agent, or Firm*—Lee & Hayes, PLLC

(57) ABSTRACT

A web page can be designed to reflect its author's presentation intentions using a Web Information Presentation Structure (WIPS). WIPS represents the web page by its layout and logic structures. A web page authored without WIPS can be subjected to a WIPS detection algorithm to discern the author's presentation intentions by deriving the layout and logic structures of the web page. Once derived, these layout and logic structures can be used to create a re-authored WIPS web page. The re-authored WIPS web page can also be adapted for presentation from one device to a different device in a manner that preserves, to a desirable degree, the author's original intentions. The WIPS detection algorithm uses a function-based object model which attempts to understand the web page author's intention by identifying and using object functions and categories contained in the web page.

70 Claims, 11 Drawing Sheets

OTHER PUBLICATIONS

"Visually Impaired," Aug. 22, 2002, <http://web.archive.org/web/20020822193408/http://linusdocs.org/HOWTOs/Acces-HOWTO-3.html>, pp. 1-6.*

M.A. Smith & T. Kanade, "Video Skimming and Characterization through the Combination of Image and Language Understanding Techniques," Proc. of Computer Vision and Pattern Recognition, 1997 IEEE, pp. 775-781.

L. Itti & C. Koch, "Computational Modelling of Visual Attention," Nature Reviews/Neuroscience, vol. 2, Mar. 2001, pp. 1-11.

L. Itti, C. Koch & E. Niebur, "A Model of Saliency-based Visual Attention for Rapid Scene Analysis," IEEE Trans. on Pattern Analysis and Machine Intelligence, 1998, 5 pages.

L. Itti & C. Koch, "A Comparison of Feature Combination Strategies for Saliency-Based Visual Attention Systems," Proc. of SPIE Human Vision and Electronic Imagin IV (HVEI'99), San Jose, CA, vol. 3644, 10 pages, Jan. 1999.

Yu-Fei Ma & Hong-Jiang Zhang, "A New Perceived Motion Based Shot Content Representation," Microsoft Research China, 4 pages.

Yu-Fei Ma & Hong-Jiang Zhang , "A Model of Motion Attention for Video Skimming," Microsoft Research Asia, 4 pages.

Colin O'Toole et al., "Evaluation of Automatic Shot Boundary Detection on a Large Video Test Suite," School of Computer Applications & School fo Electronic Engineering, Dublin City University, Glasnevin, Dublin, Ireland, Challenge of Image Retrieval, Newcastle, 1999, pp. 1-12.

T. Lin, H.J. Zhang, Q.Y. Shi, "Video Scene Extraction by Force Comeptition," IEEE Intl. Conference on Multimedia and Expo (ICME 001), Waseda University, Tokyo, Japan, Aug. 22-25, 2001, 4 pages.

Lee, Keansub et al., "Perception-Based Image Transcoding for Universal Multimedia Access," School of Electrical Engineering Korea University, Seoul, Korea, 2001 IEEE, pp. 475-478.

Christopoulos, Charilaos et al., "The JPEG2000 Still Image Coding System: An Overview," IEEE Transactions on Consumer Electronics, vol. 46, No. 4, pp. 1103-1127, Nov. 2000.

Chen, Jinlin et al., "Function-based Object Model Towards Website Adaption," (2001) Proc. of the 10th Int. WWW Conf. 10 pages.

Ma et al., A Framework for Adaptive Content Delivery in Heterogenous Network Enviornments, Jan. 2000, SPIE vol. 3969, Proceedings of MMCN00, San Jose, USA.

Zhang, Adaptive Content Delivery: A New Application Area for Media Computing Research, Jan. 2000, Available at http://research.microsoft.com/china/papers/Adaptive_Content_Delivery.pdf.

Cai et al, "Extracting Content Structure for Web Pages based on Visual Representation", ACM Transactions on Info. Sys., vol. 20, No. 1, Jan. 2002.

"Schema Objects", Chapter 10, Oracle 8 Concepts, Release Aug. 15, 1999.

* cited by examiner

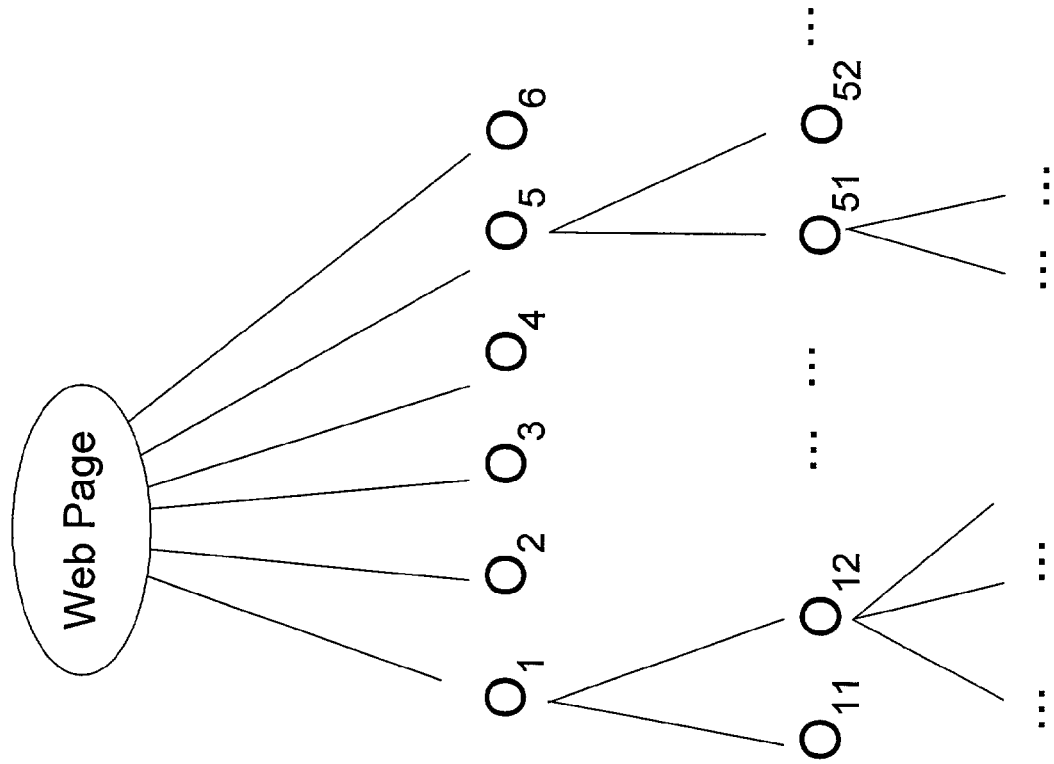
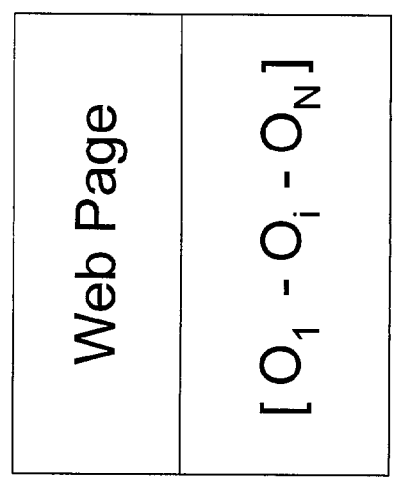
Fig. 3

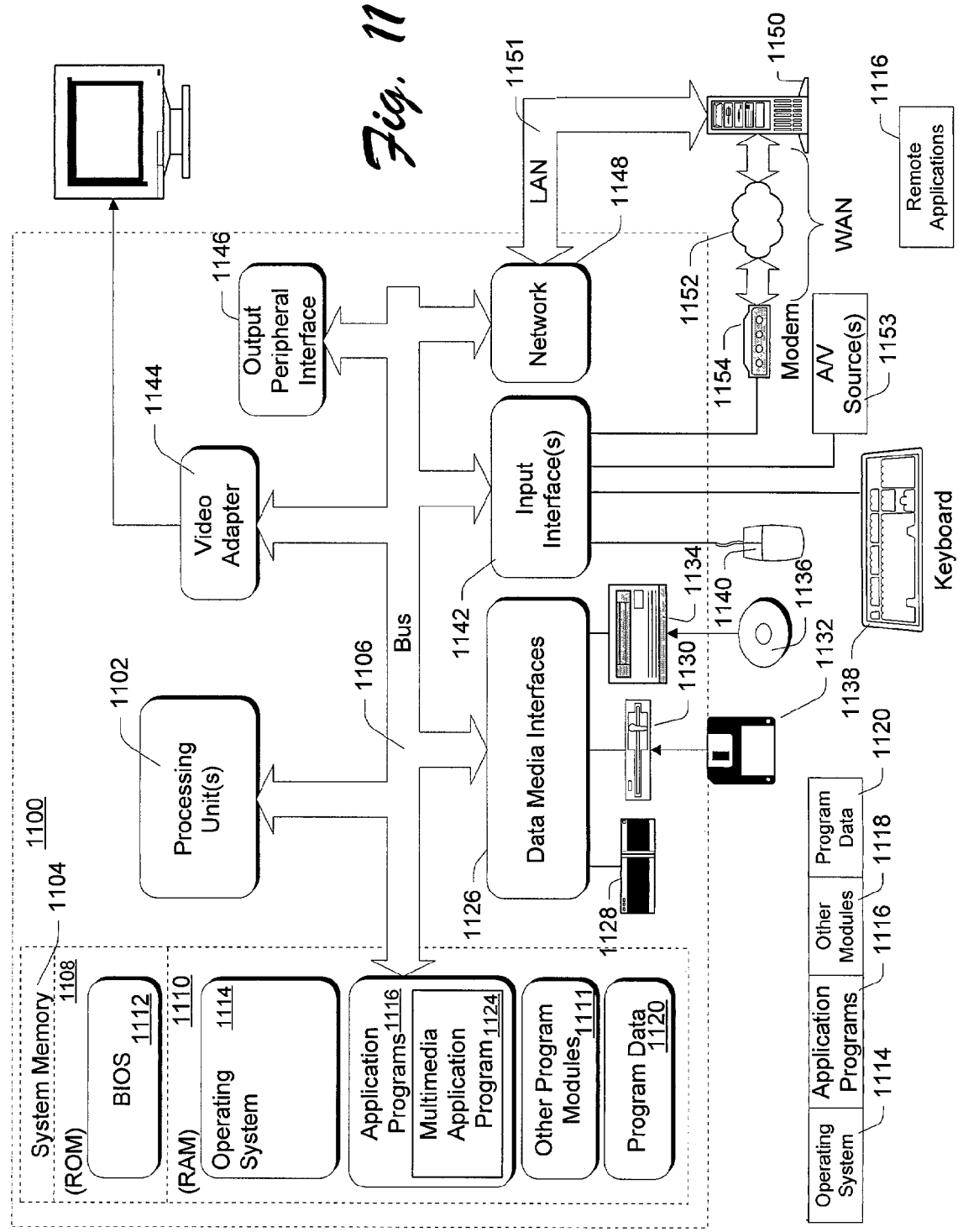

WEB INFORMATION PRESENTATION STRUCTURE FOR WEB PAGE AUTHORING

RELATED APPLICATIONS

This patent is related to U.S. patent application Ser. No. 09/893,335, filed on Jun. 26, 2001, titled "Function-based Object Model for Use in WebSite Adaptation", which is incorporated herein in its entirety by reference, and is hereinafter referred to as the "Related Patent".

TECHNICAL FIELD

This invention relates to methods and systems for presenting and rendering a web page and for adapting a web page for presentation or rendering on different devices.

BACKGROUND

The focus of web authoring today is more on creating content for the online experience instead of moving content initially created for printed pages to the web. When creating a new website, a web author first decides what content should be presented. The author needs further decide how to present the information. A markup language is applied to realize the presentation, which gives a physical structure to the web page content. Considering the whole process, the Extensible Markup Language (XML) can be used to represent the semantic structure of a web page and many markup languages, such as Hypertext Markup Language (HTML), can be used to represent the physical structure of the web page. The present state of the art, however, still lacks an effective way to represent the presentation structure of a web page that can be used by web page authors to easily design the way in which content can be presented on a web page.

Although many authoring tools, such as the FrontPage® software provided by Microsoft Corporation of Redmond, Wash., USA, have been developed to help authors with presentation design, a problem with these tools is their lack of an effective way to express and realize presentation design.

The increasing diversity in terms of devices, protocols, networks and user preferences in today's World Wide Web has made adaptive capability somewhat desirable for Internet applications. The term "adaptive capability" means having the ability to take web page content presented in one form (such as that which would be presented in the form of a website on a desktop computer) and process it to present or display it in another form (such as that which would be presented on a handheld device). Present tools achieve such adaptation only under some special conditions due to the lack of structural information. To achieve adequate adaptation, however, the web page author's intentions with respect to the presentation design should be understood and reflected in the adaptation.

The present state of the art of web authoring tools has various problems. While there is a general lack of an effective way to express web page presentation design, these tools are more focused upon physical realization. Neither are the streaming authoring interfaces suitable for the requirement of web presentation design. Web page authors may try different presentation schemes for the same content or adapt content to various devices. The present state of the art, however, lacks an effective tool to convert or adapt a current presentation design to a new one. Moreover, there is a lack of a tool to physically realize the presentation design. Although some web authoring tools do provide conversion from a layout design to a physical realization, the final results are not satisfactory. Additionally, dump and verbose codes are often generated from these prior art web authoring tools.

Some prior art approaches to representing presentation design mostly focus on printed document presentation, which is quite different from contemporary web page content presentation. Other prior art approaches, specifically for web page content, focus more on the semantic layout structure of the web page without considering the logic relationship of its web page content. As such, there is a need in the art for an effective way to fully represent the intentions of an author of a web page with respect to the presentation design of the web page.

Accordingly, this invention arose out of concerns associated with providing improved methods and systems for website design, re-authoring, and adaptation.

SUMMARY

In accordance with the described embodiments, a web page is represented with its layout structure and logic structure so as to reflect the presentation design intentions of the author of the web page using a web information presentation structure (WIPS). An algorithm is presented to automatically detect the WIPS of a web page so as to discern the web page author's intentions with respect to the presentation structure of the web page. Using the WIPS disclosed herein an author can express a web page presentation design and can use an automatic WIPS detection algorithm disclosed herein to perform re-authoring of a web page and to adapt a web page originally designed for presentation on one device to be presented on a different device. The automatic WIPS detection algorithm uses a function-based object model (FOM) that attempts to understand an author's intention that underlies an authored website by identifying and using object functions and categories. The FOM model aides in gaining a thorough understanding of an author's intention regarding a website.

BRIEF DESCRIPTION OF THE DRAWINGS

FIG. 3 is a diagram that is useful in understanding aspects of one or more described embodiments.

FIG. 5 is a diagram of an exemplary web page having a shape with an undesirable separator there through.

FIG. 11 is a block diagram of an exemplary computer environment in which various embodiments can be practiced.

DETAILED DESCRIPTION

Overview of Web Information Presentation Structure

Figure 1:
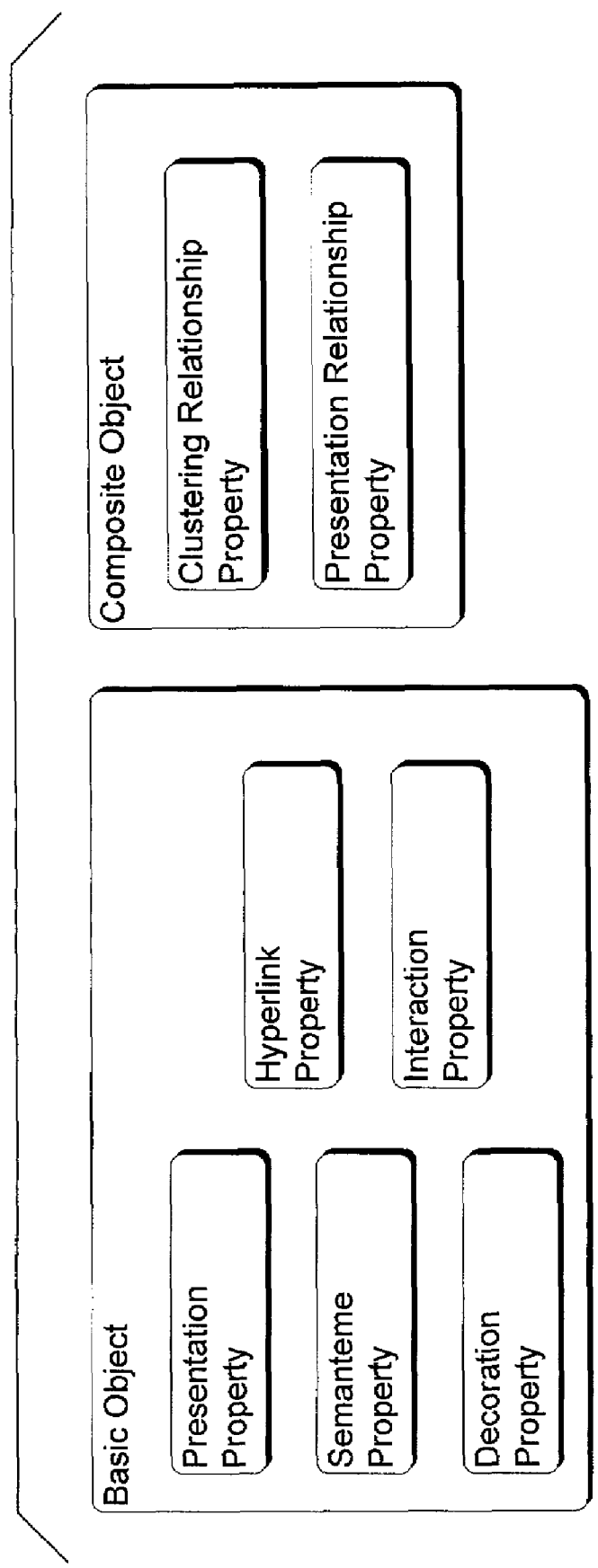
FIG. 1 is a block diagram that illustrates two exemplary objects in accordance with the described embodiments.

A Web Information Presentation Structure (WIPS) can be used in the design of a web page, in re-authoring a web page not originally designed using WIPS, and for an adaptation of a web page for presentation on a different device that it was originally designed to be presented on. Re-authoring and adaptation features an automatic WIPS detection algorithm that uses a function-based object model (FOM) as described in the Related Patent. FOM attempts to understand an author's intention that underlies an authored website. It does so by identifying and using object functions and categories. In accordance with FOM techniques, a website is analyzed to identify objects that are associated with that website. The objects are then classified as Basic Objects (BO) and composite objects (CO), as seen in FIG. 1. Each object comprising part of a website serves certain functions that reflect an author's intention regarding the purpose of the object. Based on this observation, the FOM model aides in gaining a thorough understanding of an author's intention regarding a website. FOM also provides a rule-based approach to automatically adapting the web pages of a website from one device to a different device in a manner that preserves, to a desirable degree, the author's original intention with respect to the website.

Web Page Design Using WIPS

Considering the process of presentation design for a new web page, at the beginning the author gathers all the Basic Objects for the presentation. A Basic Object is the smallest unit of a web page, which cannot be further divided into smaller parts to perform some certain functions. The author then groups related Basic Objects together to achieve a major function. This group of Objects is called a Composite Object, as described in the Related Patent. The author needs to further consider where to position the Composite Object on the web page. The choices for position are a header position, a footer position, a left position, a right position, and a body position. Different positions may have different implications for the purpose and major function of the Composite Object. For example, a particular portion of a web page content that is positioned at the top part of a web page may serve as a header, thus indicating that the major function of the particular portion is that of a headline or an abstract for the web page. Composite Objects can be further grouped into a more complex Composite Object. This grouping can be recursively performed until all the objects in a web page are grouped together.

During the web page design process using WIPS, and in order to fully express the presentation design intentions, the web page author can consider the following issues:
  (i) when grouping components into a Composite Object, the author needs to consider which objects should be grouped together into a Composite Object and what major function the Composite Object will accomplish or purpose the Composite Object will serve;
  (ii) when choosing a position at which the Composite Object is to be positioned, the author should consider what implication the position will have for the Composite Object; and
  (iii) the author should also consider how the Composite Object should be visually separated and presented on the web page.

Web Page Re-authoring Using WIPS

WIPS can be used to represent the layout structure of a web page, which is the result of dividing and subdividing the content of a web page into increasingly smaller parts, on the basis of the presentation intentions of the web page author. The layout structure of the web page includes the structure of Composite Objects and how they are separated from each other. WIPS also represents the logic structure of objects based on their human perceptible meaning, which includes both functional and positional properties of the objects.

Exemplary Definition of WIPS

Based on the foregoing discussion, a WIPS for a web page can be described in one implementation as the quintuple of variables expressed in Equation (1) which are derived from Equations (2)-(7):

$$\text{WIPS} = (O, \Phi, \delta, f, p), \text{ such that} \quad (1)$$

$$O = \{O_1, O_2, \ldots, O_n\}; \quad (2)$$

$$\text{where } O_i = \{O_i^j\}^*, \quad (3)$$

$$\Phi = \{\Phi_1, \Phi_2, \ldots, \Phi_t\}, \quad (4)$$

$$\delta = O \times O \rightarrow \Phi \cup \{\text{NULL}\}, \quad (5)$$

$$f(O_i) \in \{\text{Information, Navigation, Decoration, Interaction, Mixture}\}, \text{ and} \quad (6)$$

$$p(O_i) \in \{\text{Header, Footer, Left, Right, Body}\}. \quad (7)$$

In Equations (2)-(3) and (5)-(7), O is a finite set of objects, including Basic Objects and Composite Objects. Each Composite Object can be viewed as a sub-WIPS. In Equation (4) $\Phi$ is a finite set of separators in vision, including horizontal and vertical separators. In Equation (5) $\delta$ is the relationship of every two objects. Suppose $O_i, O_j \in O$, $\delta(O_i, O_j) \neq \text{NULL}$ indicates that $O_i$ and $O_j$ are exactly separated by the separator $\delta(O_i, O_j)$. Alternatively, the two objects $(O_i, O_j)$ are adjacent to some extent. Otherwise there are other objects between the two objects $(O_i, O_j)$.

In Equation (6), f is the functional property of an object, which reflects the intentions of the author of the web page towards what major function the object achieves or what purpose the object serves. These major functions can be an information function, a navigation function, a decoration function, an interaction function, or a mixture function. A detailed description of object functions and their corresponding function-based object modules (FOM) is set forth in the Related Patent, which has been incorporated herein by reference.

In Equation (7), p is the positional property of an object, which reflects the intentions of the author of the web page towards which position on the web page the object is to be situated. More than one object can be in the same position on a web page. The web page may have any of five (5) different positions, including a header position, a footer position, a left position, a right position, and a body position.

The header position can serve the purpose of representing a headline on the web page or an abstract for the web page. The header position also can serve as a means of giving highlight information. The footer position generally serves the purpose of providing a location on the web page where annotations are made such as copyright notices or contact information for a web master of the web site or the web page. The left and right positions on a web page are generally side bar locations that provide navigational functions which can be used to help users browse through the website. The body position is the major part of a web page which presents major content of the web page to users. Each web page need not necessarily include all of the five (5) positions, but may only include several of these positions.

According to the exemplary definition of WIPS, Equations (2)-(5) represent the layout structure of a web page, while Equations (6)-(7) represent the logic structure of the web page as expressed in the properties of the objects of the web page. Based on this exemplary definition of WIPS, web page authors can easily represent their presentation design in a formulaic manner.

Figure 2B:
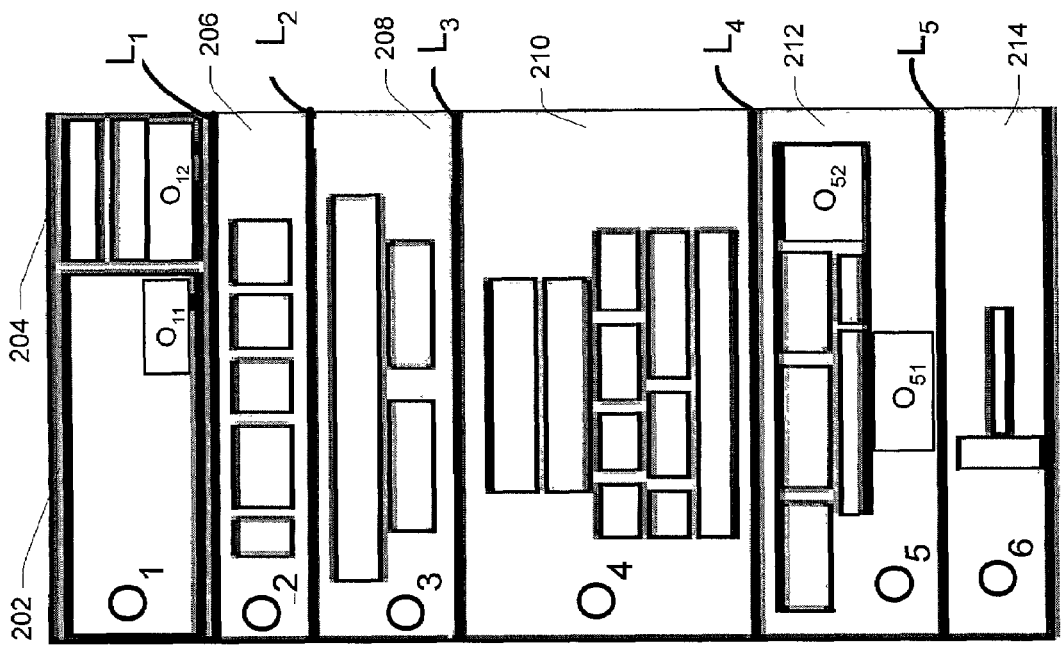
FIG. 2b is a diagram of FIG. 2a that illustrates the spatial relationship of the exemplary objects separated by separators in accordance with one or more embodiments.
Figure 2A:
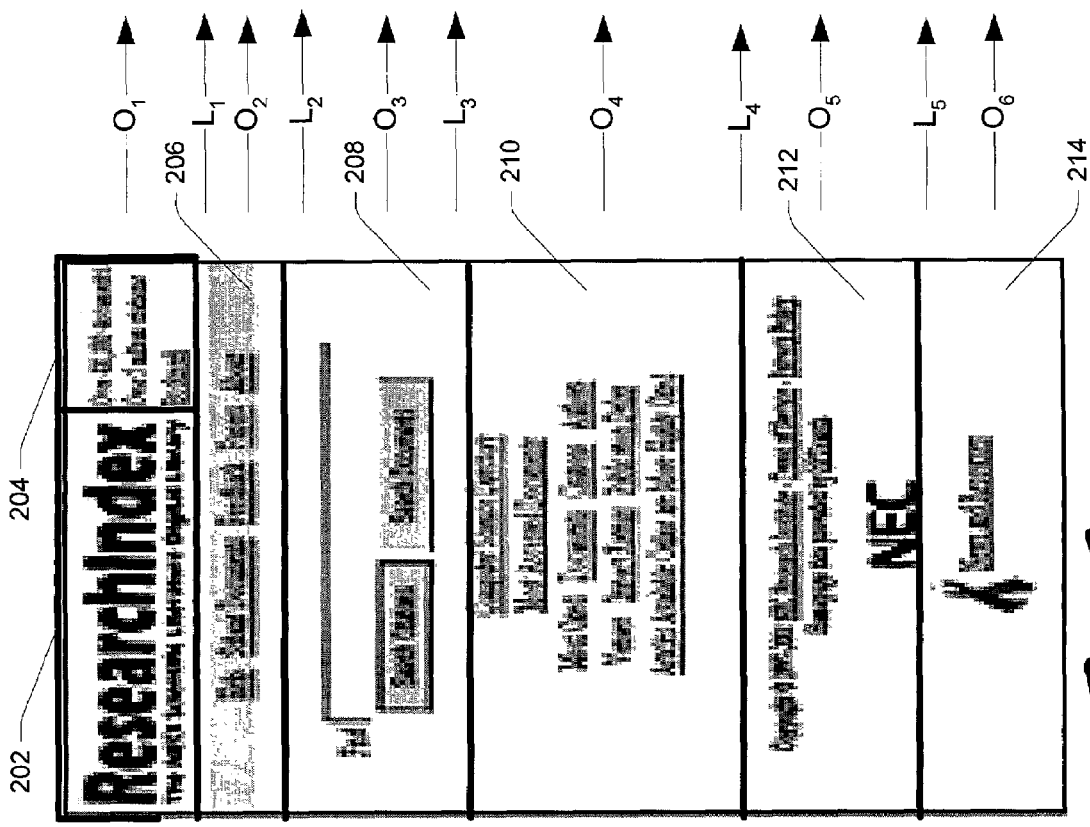
FIG. 2a is a diagram of an exemplary web page that illustrates exemplary objects in accordance with one or more embodiments.

FIGS. 2a-2b and 3 give an example of a web page in which WIPS is used in which the three variables $(O,\Phi,\delta)$ defining the layout structure of a web page of the quintuple of Equation (1) can be expresses as:

$$O=\{O_1,O_2,O_3,O_4,O_5,O_6\}; \text{ and } \Phi=\{L_1,L_2,L_3, L_4,L_5\}; \text{ and}$$

$$\delta = O \times O \to \Phi: \delta \begin{pmatrix} (O_1, O_2) \\ (O_2, O_3) \\ (O_3, O_4) \\ (O_4, O_5) \\ (O_5, O_6) \\ \text{else} \end{pmatrix} = \begin{pmatrix} L_1 \\ L_2 \\ L_3 \\ L_4 \\ L_5 \\ \text{NULL} \end{pmatrix}.$$

As can be seen in FIG. 2b, object $O_2$ has a navigation function ($f(O_2)$=navigation) and the header position is assumed by object 1 ($p(O_1)$=header). On the web page seen in FIG. 2a, horizontal separators $L_1$-$L_5$ have been designed and are reflected in FIG. 2b. The panels 202, 206, 208, 210, 212, and 214 seen in FIGS. 2a-2b respectively reflect objects $O_1$-$O_6$ seen in FIG. 2b, and are seen as Composite Objects in FIG. 3 that are illustrated as being further subdivided. For example, Composite Object $O_1$ can be divided into the two sub-objects $O_{11}$ and $O_{12}$, respectively seen in panels 202 and 204, by a vertical separator which is normal to each horizontal separator $L_1$-$L_5$, respectively seen dividing panels 202, 206, 208, 210, 212, and 214.

Automatic WIPS Detection

WIPS can be used to analyze the contents of a web page. This analysis assists in discerning the intentions of the author of the web page with respect to how the contents of the web page should be presented so that a reader/viewer of the web page will properly understand what was intended to be conveyed by the content on the web page. As such, the detection of WIPS from existing web pages can be useful in re-authoring web page content, in adaptation of web page content from one device to a different device, and for retrieving information from a web page. Although it is desirable that additional information be added for the generation of WIPS in the authoring phase, authors actually tend not to do so. Thus, automatic detection of WIPS for a web page can be significantly useful.

WIPS detection is a reverse process to authoring a web page with WIPS. WIPS detection begins with the physical structure of the web page content on a web page so as to determine the presentation scheme that was used by the author of the original web page.

Automatic WIPS detection is used to establish the quintuple of Equation (1) by first detecting the layout structure of the original web page by deriving the variables $O,\Phi,\delta$ in Equations (2)-(4), and then by detecting the logic structure of the original web page by deriving the variables p(O) and f(O) in Equations (5)-(6).

In this patent, a top-down, tag-tree independent approach based on the vision of the viewer/user when viewing a web page is proposed to detect layout structure of WIPS. The approach simulates how a user understands the web layout structure of the web page when the user browses the web page. Automatic WIPS detection is independent to physical realization and is efficient when the physical structure is significantly different from the layout structure. Additionally, as discussed below, the logic structure of the web page is also detected, which is complementary to layout structure for the generation of WIPS.

In the following two (2) sections, the layout and logic structures for WIPS are respectively discussed.

WIPS Layout Structure Detection

Detection of the layout structure of a web page is made by the division and repeated subdivision of the web page into increasingly smaller objects. The resultant layout structure, after the repeated divisions, can be represented by a geometric tree as in FIG. 3. To construct the layout structure of the web page, the Basic Objects are extracted from the physical structure, such as from the tag tree of the mark up language. The extracted Basic Objects are then subjected to a preprocess in order to find and group together apparent similar objects or discard some tiny decoration objects. This preprocess serves to reduce the computing complexity and minimize the influence of tiny decoration objects. After the preprocess, and based on how a viewer/user is intended to view the web page, the whole web page is divided into several blocks. To do so, a division process is used. The division process projects each of the blocks on to a pair of normal axes to determine separators between the blocks. Adjacent blocks are merged in a merging process according to their visual similarities. These division and merging processes continue recursively until the layout structure of the whole page is constructed. For the detection of the layout structure of a web page, each of the division process, the merging process, and the preprocess are further discussed below for one implementation.

The Division Process of the WIPS Layout Structure Detection

Figure 4C:
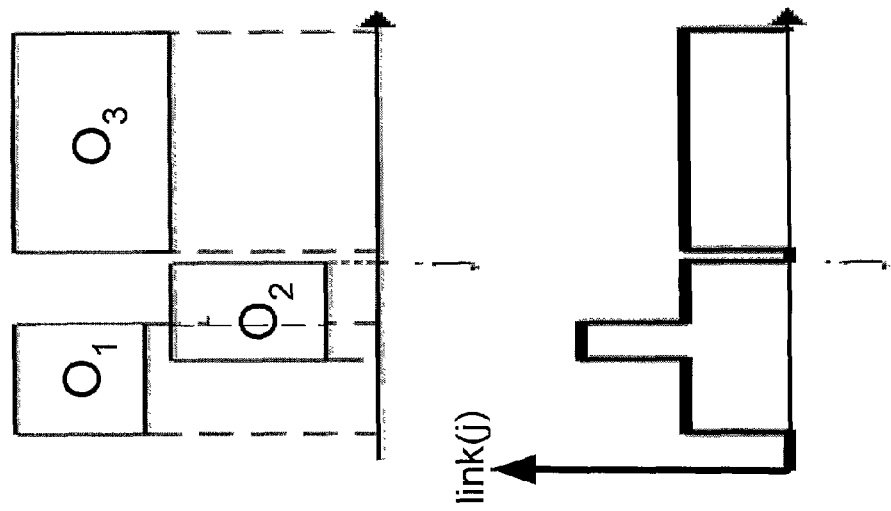
FIGS. 4a through 4c are diagrams that are useful in understanding aspects of one or more described embodiments.
Figure 4B:
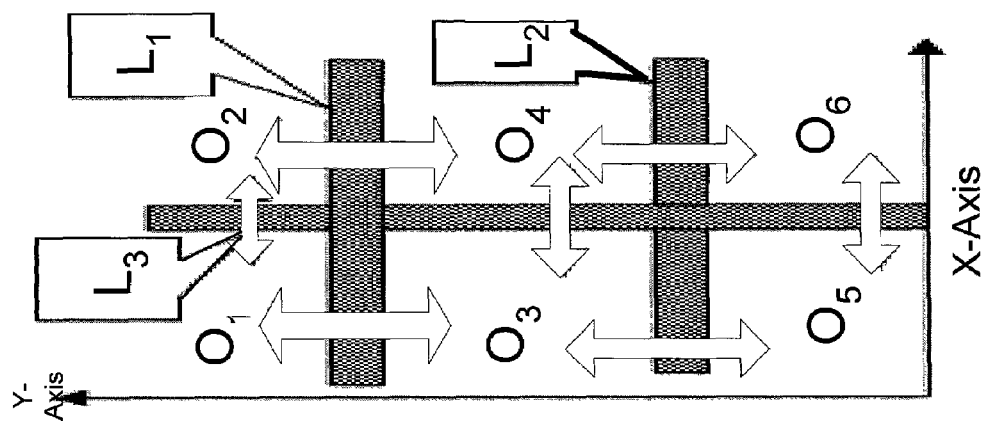
Figure 4A:
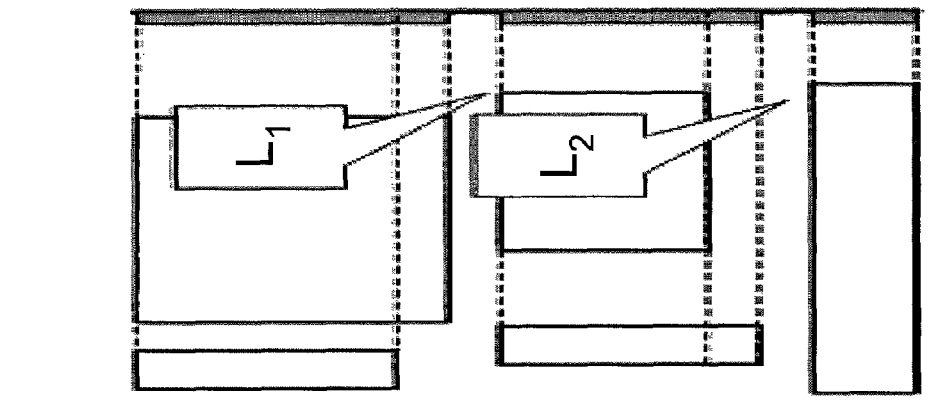

The Division process uses a projection process. The projection process refers to the mapping of a web page into a waveform whose value is the sums of the values of the object weights along an axis of projection. All objects in a web page are contained in rectangular blocks. Blanks are placed between these rectangles. Thus, the projection profile of the rectangles of the objects and the blanks is a waveform whose deep valleys correspond to the blank areas of the web page. A deep valley with a width greater than an established threshold can be considered as a separator between objects, where the separator is normal to the axis of projection. The projection process can be performed recursively until all the objects are located and each separator between respective rectangles has been determined. FIGS. 4a through 4c gives an example of the projection process where rectangle contains an object and is projected along a projection axis. The sub-lines in the projection axis without any objects projecting into the projection axis indicate the separators, such as is seen at $L_1$ and $L_2$ in FIG. 4a.

FIG. 4c shows the results of the projection process performed from shapes that are rectangles in FIG. 4a. Note that other shapes could also be used. Let $\{O_1, O_2, \ldots, O_n\}$ be the n objects in the current block containing rectangles, and $s_i$, $e_i$ be the starting and ending points of object $O_i$ along an axis of projection. All separators $\Phi = \{L_1, L_2, \ldots, L_t\}$ are to be found along the axis of projection. The axis link[j] can be used to assess the value of point j along the axis of projection. Then the weight value of $O_i$ (1 by default) should be added to link[j], where $s_i \leq j < e_i$. The variable j is considered as a separator point if link[j] is zero or otherwise below a predetermined threshold. An algorithm description, in one implementation, for the projection process follows.

Let C be the set of the starting and ending points of all the objects, where: $C = (\cup_i \{s_i\}) \cup (\cup_i \{e_i\})$, $|C| = K$. The elements in C are then sorted into ascending order. Let link[0]=0. After the shapes (e.g. rectangles) containing all objects are then projected onto the axis of projection, then for (j=1; j<=K;j++) link[j]=link[j−1]+c−d, where c is the number of objects with starting points at C[j], and where d is the number of objects with ending points at C[j]. Note that the default weight of each object can be used and that different weights can be applied to decide link[j] for a more or less accurate result. Thus, sub-line C[j]+1 . . . C[j+1]−1 is a separator if link[j] is 0.

The foregoing algorithm requires a cost of O(n) in computing time because each step above costs O(n) in computing time. Using the algorithm above, separators $L_1[0 \ldots t_1-1]$ are detected in the X-axis of projection and also separators $L_2[0 \ldots t_2-1]$ are detected in the Y-axis of projection. Thus, the division in current level is:

$O = \{O_1, O_2, \ldots, O_{(t_1+1)(t_2+1)-1}\}$, where sub-blocks are indexed from left to right FIG. 4b; and $\Phi = L_1[0 \ldots t_1-1] \cup L_2[0 \ldots t_2-1]$; and $\delta(O_{i(t_1+1)+j}, O_{i(t_1+1)}) = L_2[j] (0 \leq i \leq t_2, 0 \leq j < t_1)$; and $\delta(O_{i(t_1+1)+j}, O_{(i+1)(t_1+1)+j}) = L_1[i] (0 \leq i < t_2, 0 \leq j \leq t_1)$.

For example, in FIG. 4b, the projection of rectangles onto the Y-axis of projection reveals two (2) horizontal separators $L_1$ and $L_2$ while the projection of rectangles onto the X-axis of projection reveals one (1) vertical separator $L_3$. These three (3) separators $L_1$-$L_3$ divide the current block into six sub-blocks for objects $O_1$-$O_6$. The seven (7) bidirectional arrows seen in FIG. 4b represent the relationship between sub-blocks and separators. Thus the first three (3) variables $(O, \Phi, \delta)$ in the WIPS quintuple of Equation (1) are detected.

The Merging Process of Sub-blocks: Layout Structure Similarity

Since the division process discussed above is only related to the position of objects, the separators detected may break a holistic object. Because some objects on a web page are intended by the author not to be divided, but rather were intended to be represented as a whole, the merging process is performed for some adjacent sub-blocks according to the following algorithm.

Simulating the human sensibilities as to whether two objects are similar can be discerned by visual similarity in order to decide whether two objects are holistic and should be merged. The definition of visual similarity in the Related Patent can be used in addition to the following additional rules that modify visual similarity between objects for this patent:

(i) Distance is a factor used by humans to decide visual similarity. Let d be the distance between two objects. The larger that d is, the less the visual similarity is between two objects. Let x be the visual similarity as obtained in the Related Patent, and a monotone digressive function Dist_Modifer(d) is applied to embody the impact of distance to similarity:

x=x·Dist_Modifer(d); and (ii) Color may have an influence upon a human in deciding visual similarity. Two objects with the same distinguished color and background color (different from the same of surrounding objects) can be considered to be a whole, thus rendering:

$$x = \begin{cases} 1, \text{ Adjacent objects with the same color \& background color} \\ x, \text{ Otherwise} \end{cases}.$$

From the foregoing merger process, a decision can be made as to whether two adjacent objects should be merged according to their visual similarity.

Preprocessing

Figure 5:
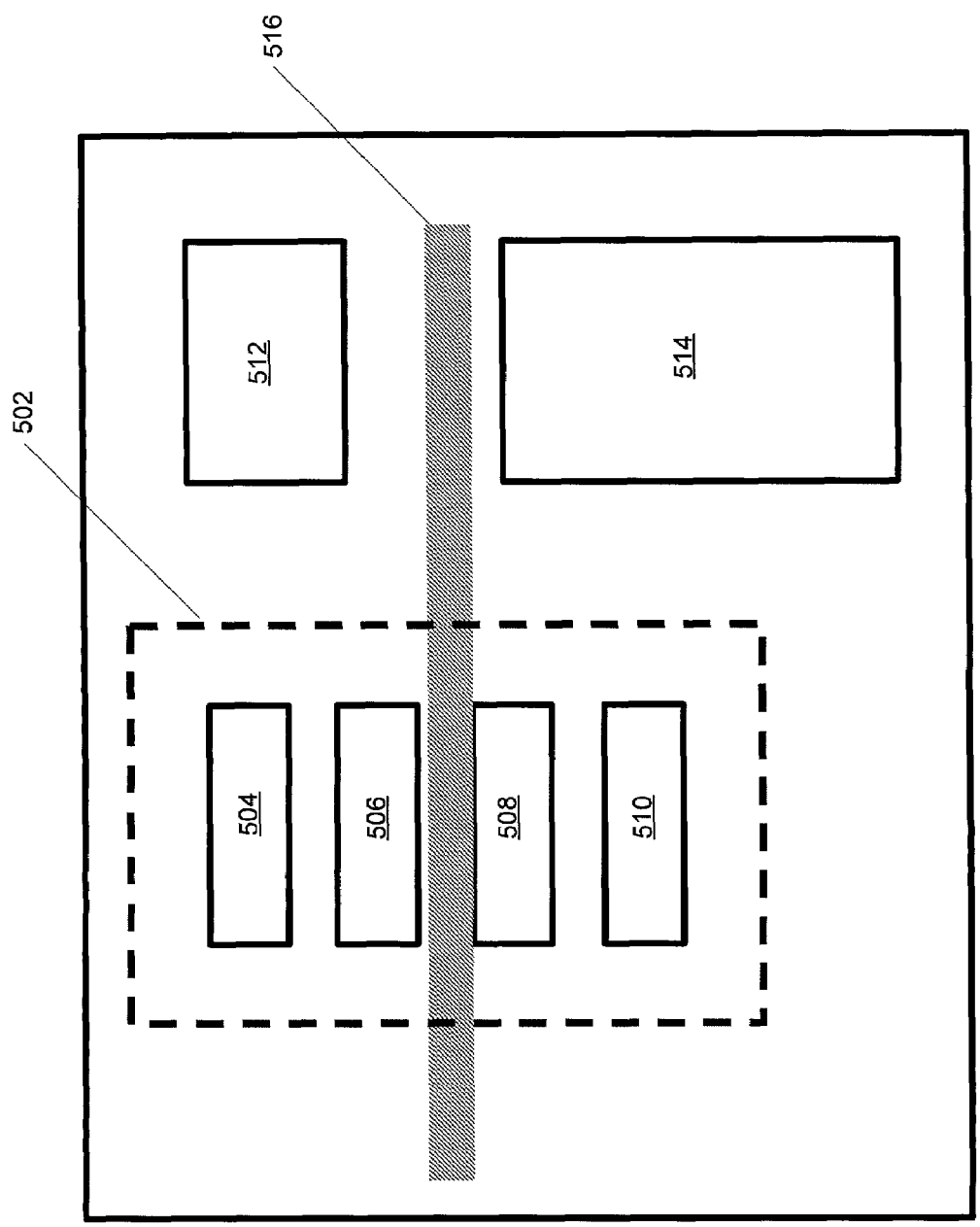

Preprocessing can be used to prevent decoration objects from enveloping separators or prevent unexpected separators from breaking object integrity. By way of example, FIG. 5 shows a web page having rectangles 502, 512, and 514. Objects are contained in rectangles 504-510, which in turn are contained in rectangle 502. The intention of the author of the web page can be determined to represent the objects in rectangle 502 has a whole. Nevertheless, the process detects a separator 516 that undesirably separates rectangle 502 between rectangles 506 and 508. Thus, proprocessing can be used to remove the detection of undesired separators.

Decoration objects include all invisible objects (such as background music, comment, <BR>, <HEAD> objects in HTML) and little sized or non-content text or image such as white space and so on. These decoration objects can be ignored in the projection process to minimize their influence.

Since too many objects in a current block under analysis may result in unexpected separators, which cannot be identified with only layout information, functional analysis as described in the presentation re-design and adaptation discussion, below, can be applied to prevent these unexpected separators from being detected. Moreover, a Composite Object may be considered as a Basic Object if the Composite Object serves the purpose of achieving an integrated function. In this way, the Composite Object will not be broken by an undesired separator that is detected in the projection process. As such, the described preprocessing decreases the opportunity of detecting unexpected separators and thereby reduces computational expense.

WIPS Logic Structure Detection

After the WIPS layout structure of a web page has been detected, the WIPS logic structure of the web page can be detected. WIPS logic structure detection includes a major function detection with respect to the functional properties of each object of the web page, as well as the detection of the type of position assumed by each object. These detections of the WIPS logic structure of the web page are discussed below.

Major Function Detection of Composite Objects

Figure 6:
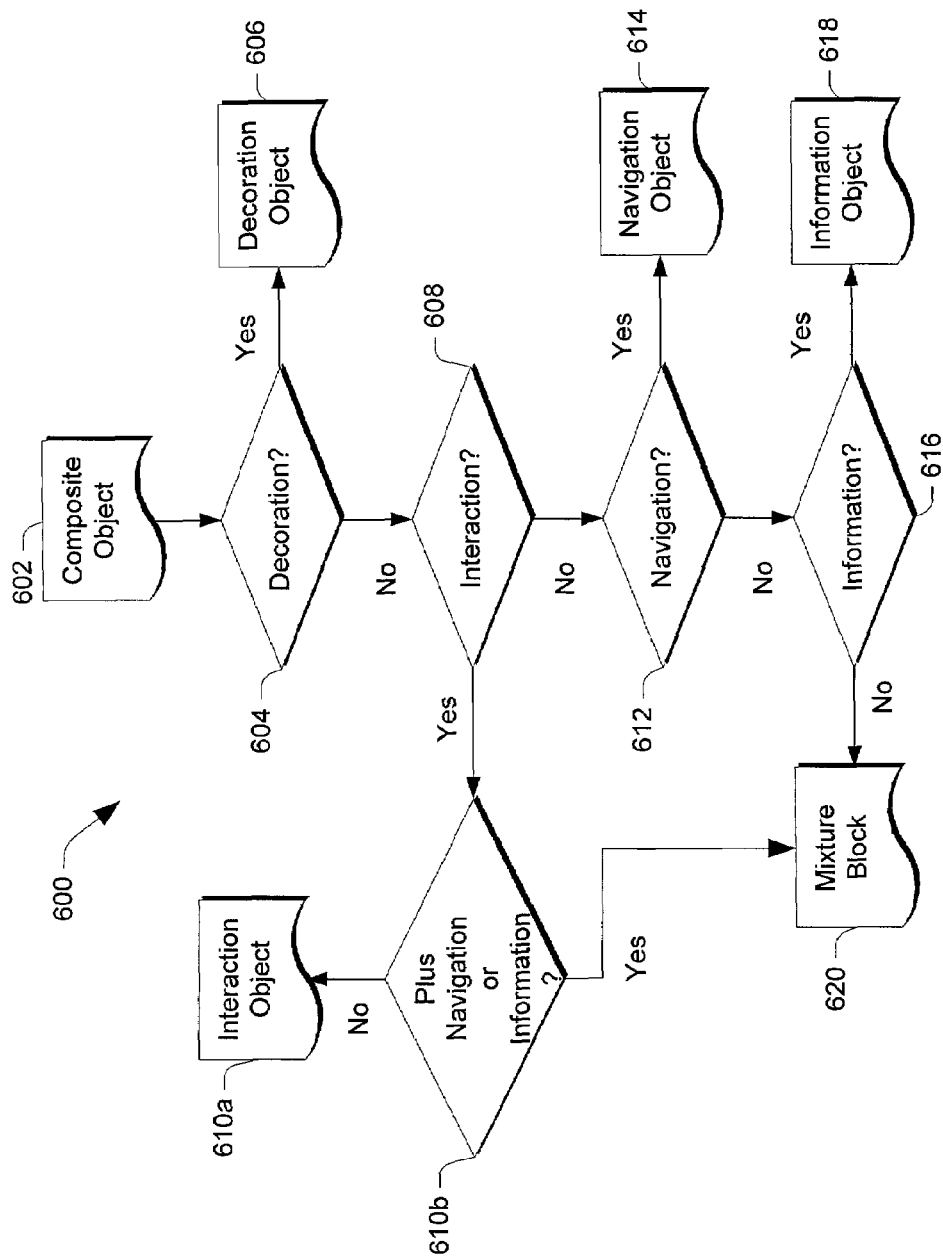
FIG. 6 is a flow diagram of a decision-making process in accordance with one or more embodiments.

In the Related Patent, a detailed scheme for function-based object models and function detection were disclosed. In this patent, additional considerations are added to the detailed scheme of the detection of major functions achieved by composite objects on a web page. FIG. 6, which gives an implementation of the additional considerations for the detection of major functions of Composite Objects, is discussed below. Composite Objects can be deemed to achieve, overall, one of the following major functions: a decoration function, an interaction function, a navigation function, an information function, and a mixture function. Each of these major functions is discussed below.

A Composite Object can be adjudged to perform, on the whole, a decoration function when all of the objects of the Composite Object are decorative. A basic decoration object, as discussed above, includes all invisible objects and little sized or non-content text or image such as white space, etc.

A Composite Object performs an interaction function when, in the human visual perception, the content of the block in which the Composite Object is defined contains interaction elements (e.g. INPUT, SELECT, FORM). Other contents inside the block should also be related to the interaction contents in order for the Composite Object to be deemed to perform an interaction function.

If most of the components in a Composite Object are navigation components (e.g. a simple majority), then the Composite Object should be determined to achieve a navigation function.

Similar to the determination for the navigation function, the Composite Object should be adjudged to achieve an information function when the majority of the objects in the Composite Object are without a hyperlink.

Turning now to FIG. 6, a block 602 initiates a process 600 for detecting a major function accomplished by a Composite Object. At block 604, a determination is made as to whether the major function accomplished by the Composite Object is that of a decoration function. If it is, then process 600 terminates at block 606, but if not, then block 608 determines whether the major function accomplished by the Composite Object is that of an interaction function. If none of the objects in the Composite Objects performs an interaction function as determined at block 608, then process 600 moves to block 612. If all of the objects in the Composite Object are related to an interaction function as determined at block 610b, then process 600 terminates at block 610a. Otherwise, block 610b determines whether objects achieving navigation and/or information are also within the Composite Object. If so, then process 600 determines the major function of the Composite Object to be a mixture function at block 616 and process 600 terminates at block 620.

In making the interaction function determination with any Composite Object, various techniques can be used. In one implementation, the percentage of area taken up by the rectangles of the interactive objects within the whole rectangle of the Composite Object is examined. If the percentage of area of the interaction object rectangles is larger than a predetermined threshold, then the major function of the Composite Object should be deemed to be that of an interaction function. Otherwise it should be deemed to be that of a mixture function.

Process 600, at block 612, an examination of the Composite Object is made in order to determine if it performs a navigation function. If so, then process 600 terminates at block 614, but if not, then block 616 makes a determination as to whether the Composite Object performs an information function. If the evaluation at block 616 deems the Composite Object to perform an information function, then process 600 terminates at block 618, otherwise process 600 terminates at block 620 by determining the Composite Object to achieve a mixture function.

In one implementation, the major function achieved by each Composite Object in a web page is deemed to be a mixture function when all other function determinations are decided negatively. An exception occurs at the interaction function determination in that if the Composite Object contains objects achieving both navigation or information functions, then the function of the Composite Object is deemed to achieve a mixture function.

Position Type Detection of Composite Objects

A Composite Object can be determined to be situated on the web page in one of several different positions. These positions are the header position, the footer position, the left side position on the web page, the right side position on the web page, and the body of the web page, each of which are discussed below.

In making a judgment with as to whether a Composite Object occupies the header position on a web page, which is the top of the web page, an upper N number of pixels of the web page can be defined as the header position. The overall shape of the Composite Object, which is generally made up by the objects therein, should also be taken into account. In one implementation, the flatter that the Composite Object appears, the larger the number N should be. The footer position judgment can be made similar to that of the header position judgment.

In deciding whether a Composite Object occupies the left side position of the web page, a left 'n' percentage (e.g. 30% by default) area of the web page can be a predetermined threshold. Thus, Composite Objects which fall into this region are deemed to be Composite Objects with a left position property. The right position judgment can be made similar to that of the left position judgment.

Figure 7:
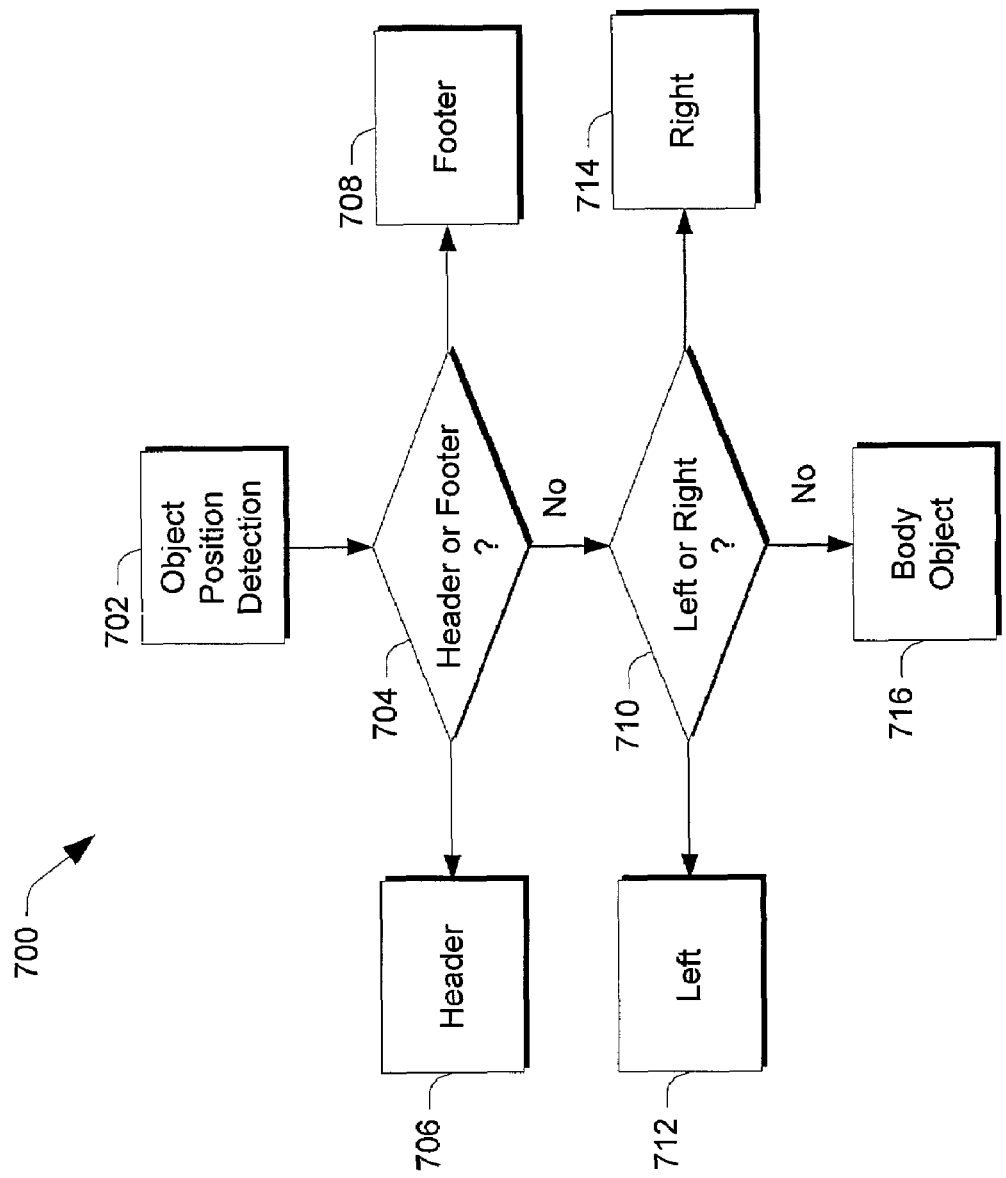
FIG. 7 is a flow diagram of a decision-making process in accordance with one or more embodiments.

FIG. 7 shows a process 700 for making a decision as to the positional property of a Composite Object, beginning at block 702. From block 702, process 700 moves to block 704 where it is decided whether the position of the Composite Object is header or footer. If so, process 700 terminates, respectively, at blocks 706 and 708. If not, then process 700 moves to block 710 where it is decided whether the position of the Composite Object is left or right. If so, process 700 terminates, respectively, at blocks 712 and 714. If not, then process 700 terminates at block 716 after determining that the Composite Object should take on the positional property of the body position. In one implementation, the header and footer decision is made first.

Content Authoring based on WIPS

Content authoring, when based on WIPS, expresses a web page with an orientation towards how the web page will be presented to a viewer/user. Conversion or adaptation of a web page that was conventionally authored should also advantageously take a similar approach to creating a new web page that preserves the presentation design intentions of the author. By using WIPS, a web page author need only concentrate on a presentation scheme in performing presentation design, re-authoring and adaptation. Additionally, web pages created with other HTML authoring tools can be re-authored based on WIPS. With the WIPS detection technology as presented above, the WIPS can be extracted from the original web page for content re-authoring.

Presentation Design Based on WIPS

Figure 9:
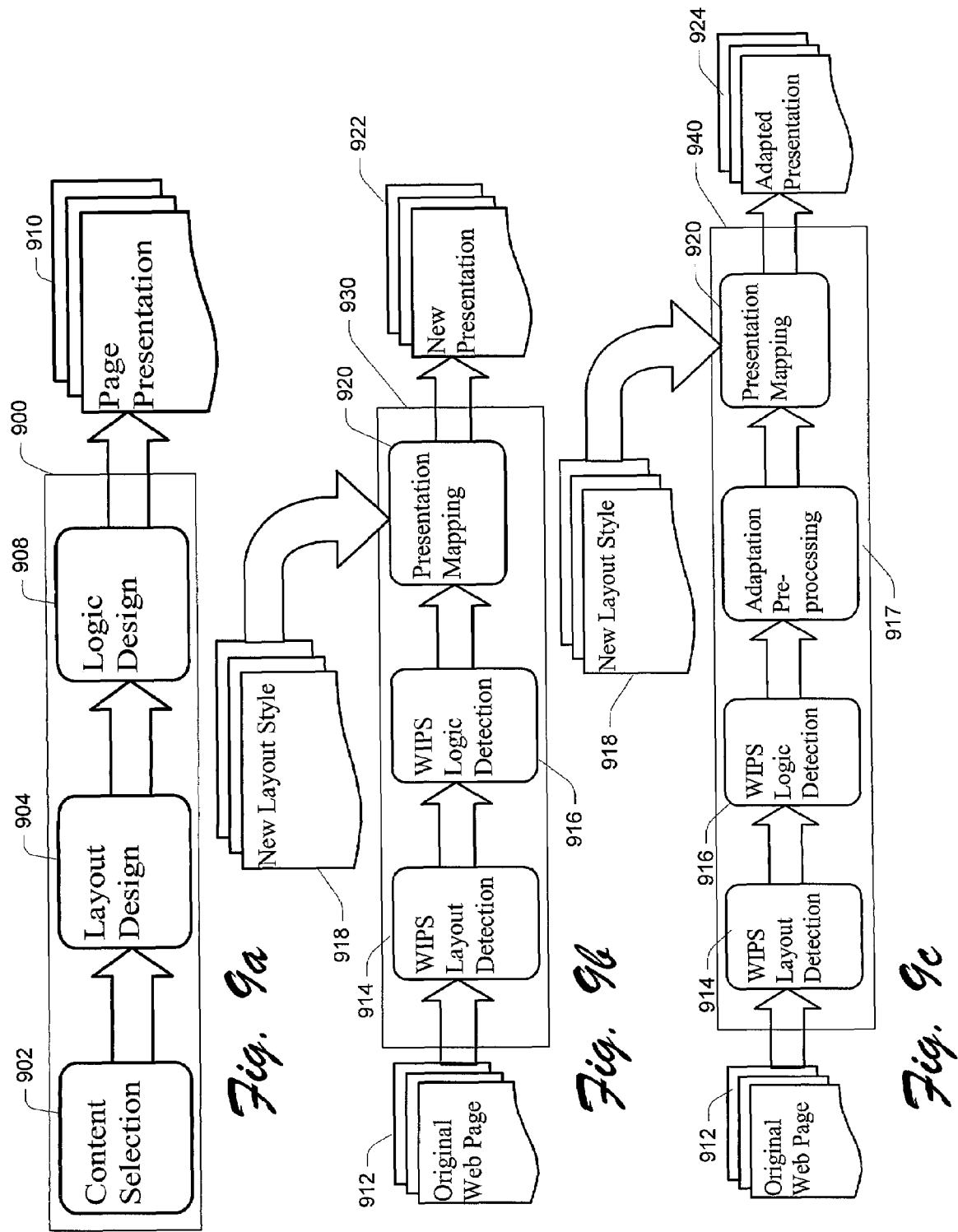
FIGS. 9a through 9c are block diagrams of exemplary computer architectures in accordance with one or more embodiments that are useful, respectively, for web page presentation design, re-authoring, and adaptation.

FIG. 9a illustrates an exemplary system architecture 900 that can be utilized by an author to use WIPS to design a web page. Architecture 900 is desirably implemented in software. A content selection module 902 allows the author to select various objects to be displayed as content on the web page. Content selection module 902 can generate a function-based object model using the techniques described in the Related Patent. A layout design module 904 receives the content selected by the author from the content selection module 902. As described above, the first three variables (O,Φ,δ) of the quintuple of variables set forth in Equation (1) are derived in layout design module 904. A logic design module 908 receives the layout design criteria from the layout design module 904 based upon the author's input. As described above, the last two variables f(O), p(O) of the quintuple of variables set forth in Equation (1) are derived in logic design module 908. The WIPS web page can then be presented at block 910 seen in FIG. 9a.

Figure 8:
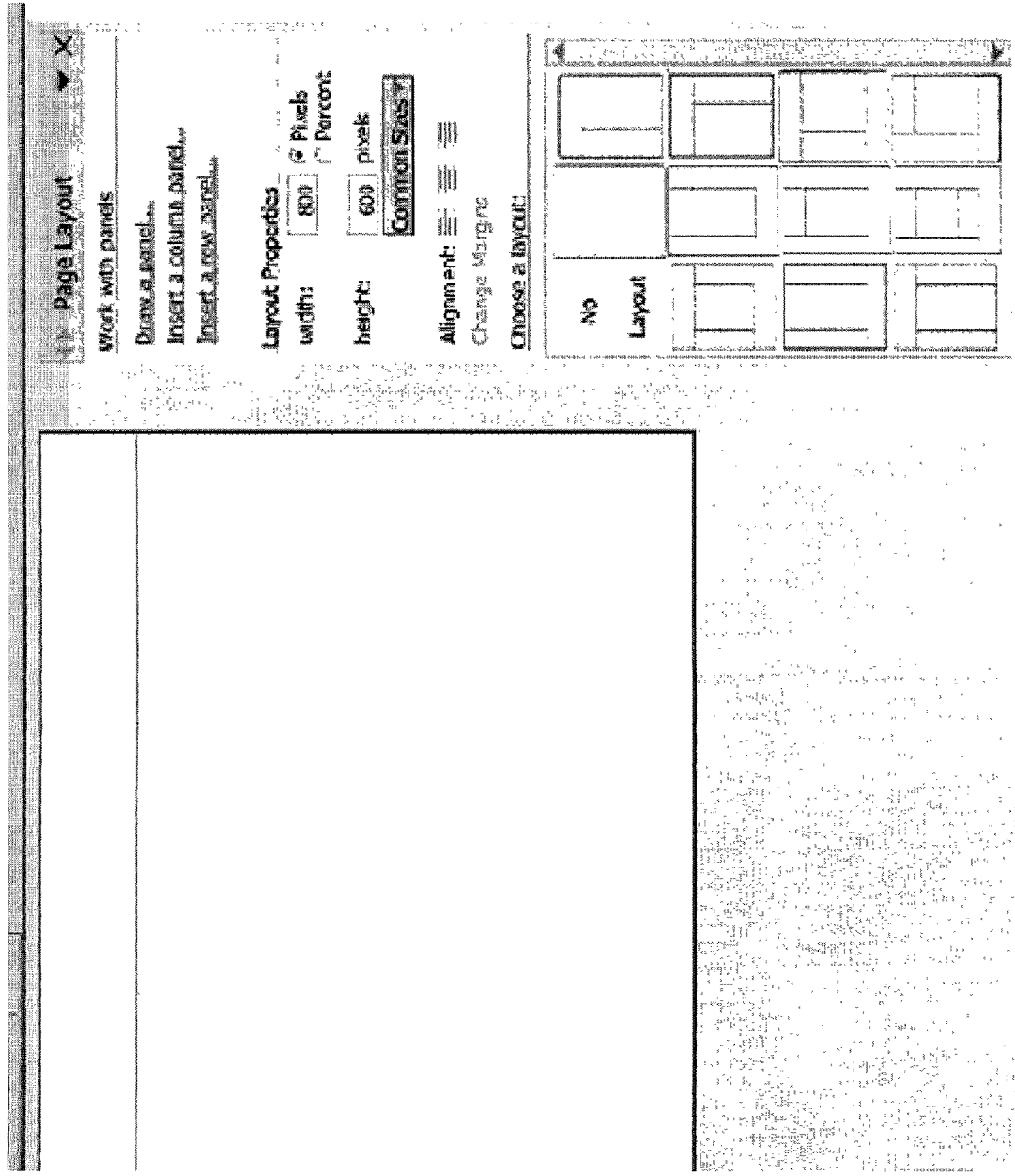
FIG. 8 is an exemplary user interface display for web page design.

Based on WIPS, a process to design the presentation of a new web page is taken by an author. An example of a user interface display 800 that can be used by the author is seen in FIG. 8. The author first decides a layout structure of a new web page which is to be constructed in a work area 802 of user interface display 800. The author can select the layout structure from pre-defined layout styles 804 seen in the lower right hand side of the user interface display 800. The author can then add panels and parts at specific positions of the web page. Panels are rectangular regions that can be laid out on a web page and can contain various parts, including text, images, and arbitrary html parts. Panels and parts are used together to correspond to respective objects in WIPS. The layout structure of WIPS is visually presented with nested panels. The logic structure of WIPS is represented with the content type of the respective panels and parts as a combination of the respective functional and positional properties of each. A recursive process is followed until all the objects of the WIPS are properly added as panels and parts.

Physical Realization of the WIPS Based Presentation Design

A panel may have many properties such as header, footer, function, position, size, etc. The individual panels are implemented as HTML tables. The simplest panel can be a single cell table. The most complex panel requires an outer layout table and further nesting of two or more tables for each panel in the layout. The rows and cells of each panel support or contain the decorative elements of the panel (eg. borders, margins, round corners, drop shadow images, etc.) Although panels are realized with HTML tables, they are more than just tables, and more than just a way to organize a web page. Panels make it easy to create visually sophisticated layouts that normally require the help of a professional graphic designer. Panels can be easily dropped on a page in an intuitive, discoverable way with obvious visual feedback indicating the outcome of the action. A panel master table is generated to contain the WIPS of the page. The panel master table is a zero-border, zero-cell-padding, zero-cell-spacing table with the sole purpose of containing panels. The master table is re-configured as needed when panels are added and removed from the page. There is only one master table per page.

Web Page Presentation Re-design and Web Page Adaptation

During the authoring process it is desirable that different presentation schemes can be tried for the same content. On the other hand, the increasing diversity of web page content in today's World Wide Web has made presentation adaptation desirable for web page content. Based on WIPS, layout re-design and adaptation is accomplished, in part, by a WIPS mapping from the original presentation to the new presentation. Re-design and adaptation are realized by generating a new layout table and placing panel contents from the original page into the newly generated panels.

Presentation Re-design

FIG. 9b illustrates an exemplary system architecture 930 that can be utilized for web page presentation re-design based on WIPS. Architecture 930 is desirably implemented in software. A WIPS layout detection module 914 generates a FOM for an original web page 912 using the techniques described in the Related Patent. WIPS layout detection module 914 then detects the structures in the design of an original web page 912. Optionally, this latter step can also be manually predetermined. The output from the WIPS layout detection module 914 is received by a WIPS logic detection module 916. As described above, the logic structure in WIPS includes functional and positional properties of a Composite Object, which reflects the intention of the web page author towards the web page content. Input from a new layout style 918 is used in a presentation mapping module 920 to map from the original web page 912 onto a web page in the new presentation 922. In this mapping process, the Composite Objects are mapped from the original web page 912 to the new web page of the new presentation 922 based on the rule that objects of the new web page should have the same logical relationship in the new web page as in the original web page 912.

Presentation Adaptation

FIG. 9c illustrates an exemplary system architecture 940 that can be utilized for web page presentation adaptation based on WIPS. Architecture 940 is desirably implemented in software. WIPS layout detection module 914 generates a function-based object model for an original web page 912 using the techniques described in the Related Patent. WIPS layout detection module 914 then detects the structures in the design of the original web page 912. The latter step can, optionally, be manually predetermined. The output from WIPS layout detection module 914 is received by WIPS logic detection module 916. As described above, the logic structure in WIPS includes functional and positional properties of a Composite Object, which reflects the intention of the web page author towards the web page content. An adaptation preprocessing module 917 processes the output from WIPS logic detection module 916 to conform the content of the web page to the constraints and objectives of the device for which original web page 912 is being adapted. Adaptations are made according to FOM adaptation rules disclosed in the Related Patent and, where employed, language conversion rules. Input from a new layout style 918 is used in a presentation mapping module 920 to map from the original web page 912 onto an adapted presentation 924. In this mapping process, the Composite Objects are mapped from the original web page 912 to the web page of the adapted presentation 924 based on the rule that objects of the adapted presentation 924 should have the same logical relationship in the adapted presentation 924 as in the original web page 912. Accordingly, system architecture 940 produces web-adapted content in the form of the adapted presentation 924 from the original web page 912, such as by adapting a desktop web page display to a display for a wireless application protocol (WAP) device.

A presentation adaptation based on WIPS involves device-specific adaptation rules. Based on these rules, suitable presentation schemas can be generated for a new device and the web page adaptation can then be made as a presentation re-design. Discussed below is an example of presentation adaptation for the Microsoft® Pocket PC software of the Microsoft Corporation, Redmond, Wash., USA.

To enable users to browse the web easily with wireless thin clients using software such as the Microsoft® Pocket PC software, prior art approaches of content adaptation exist. Most prior art approaches are tag tree based, which generally lead to unstable results due to the misuse of HTML tags and the complexity of web page content. To solve this problem, a WIPS-based approach is proposed. As indicated above, to make an adaptation the web page author needs to take into account the different capabilities of the Microsoft® Pocket PC software, which includes that (i) the Microsoft® Pocket PC software may not support certain media types which are supported by desktop software; and (ii) the display screen of a device executing the Microsoft® Pocket PC software is relatively smaller than that of a desktop device.

Corresponding to the differences between devices, the following device-specific adaptation rules can be applied:
(A) contents with unsupported media types or presentation properties are discarded or replaced with short text; and
(B) specific adaptation operations (zooming, splitting and reorganizing) for some Composite Objects may be performed according to the practical situation:
  (i) large objects such as large images are zoomed to fit the small screen of a device used with the Microsoft® Pocket PC software;
  (ii) large pages such as are found on desktop displays may be full of contents that cannot be zoomed. Thus they should be broken into several sub-pages; and
  (iii) there may be unusual web pages that cannot be adapted easily. For example, a page with a large width and a small height cannot be adapted appropriately through zooming or splitting. Thus, the layout of the web page should be re-organized.

Based on the rules above, new layout templates can be specified for the Microsoft® Pocket PC software. Then the adaptation process turns into mapping the WIPS of the original web page for a desktop display to the new WIPS for a display on a device executing the Microsoft® Pocket PC software. Similar to the presentation re-design process, this process can also be performed with the layout mapping process.

Figure 10:
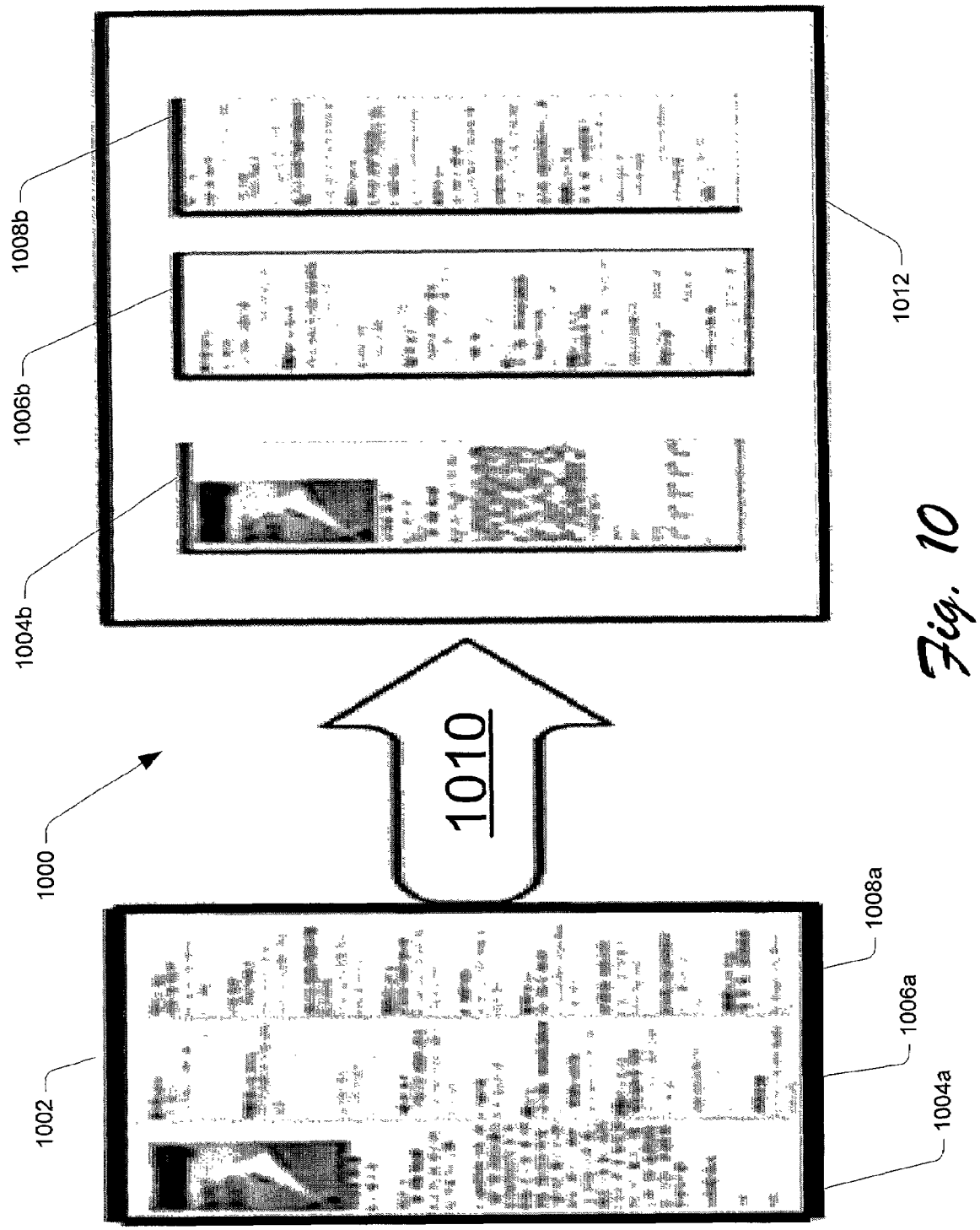
FIG. 10 is a diagram of an exemplary web page, and a diagrammatic representation of an inventive adaptation process.

FIG. 10 shows an example of content adaptation from a desktop display to a display that is rendered by the Microsoft® Pocket PC software. In the adaptation depicted in FIG. 10, a WIPS adaptation process 1010 is performed in which an original web page 1002 contains three (3) panels 1004*a*, 1006*a*, and 1008*a*. Adaptation process 1010 splits original web page 1002 and maps each of the three (3) panels 1004*a*, 1006*a*, and 1008*a*, respectively, into three new smaller web pages 1004*b*, 1006*b*, and 1008*b*.

Exemplary Computer Environment

The embodiments described above can be implemented in connection with any suitable computer environment. Aspects of the various embodiments can, for example, be implemented, in connection with server computers, client computers/devices, or both server computers and client computers/devices. As but one example describing certain components of an exemplary computing system, consider FIG. 11.

FIG. 11 illustrates an example of a suitable computing environment 1100. It is to be appreciated that computing environment 1100 is only one example of a suitable computing environment and is not intended to suggest any limitation as to the scope of use or functionality of the inventive embodiments. Neither should the computing environment 1100 be interpreted as having any dependency or requirement relating to any one or combination of components illustrated in the exemplary computing environment 1100.

The inventive techniques can be operational with numerous other general purpose or special purpose computing system environments or configurations. Examples of well known computing systems, environments, and/or configurations that may be suitable for use with the inventive techniques include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the inventive techniques can be described in the general context of computer-executable instructions, such as program modules, being executed by a computer. Generally, program modules include routines, programs, objects, components, data structures, etc. that perform particular tasks or implement particular abstract data types. The inventive techniques may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 11 computing system 1100 is shown comprising one or more processors or processing units 1102, a system memory 1104, and a bus 1106 that couples various system components including the system memory 1104 to the processor 1102.

Bus 1106 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 1100 typically includes a variety of computer readable media. Such media may be any available media that is locally and/or remotely accessible by computer 1100, and it includes both volatile and non-volatile media, removable and non-removable media.

In FIG. 11, the system memory 1104 includes computer readable media in the form of volatile, such as random access memory (RAM) 1110, and/or non-volatile memory, such as read only memory (ROM) 1108. A basic input/output system (BIOS) 1112, containing the basic routines that help to transfer information between elements within computer 1100, such as during start-up, is stored in ROM 1108. RAM 1110 typically contains data and/or program modules that are immediately accessible to and/or presently be operated on by processing unit(s) 1102.

Computer 1100 may further include other removable/non-removable, volatile/non-volatile computer storage media. By way of example only, FIG. 11 illustrates a hard disk drive 1128 for reading from and writing to a non-removable, non-volatile magnetic media (not shown and typically called a "hard drive"), a magnetic disk drive 1130 for reading from and writing to a removable, non-volatile magnetic disk 1132 (e.g., a "floppy disk"), and an optical disk drive 1134 for reading from or writing to a removable, non-volatile optical disk 1136 such as a CD-ROM, DVD-ROM or other optical media. The hard disk drive 1128, magnetic disk drive 1130, and optical disk drive 1134 are each connected to bus 1106 by one or more interfaces 1126.

The drives and their associated computer-readable media provide nonvolatile storage of computer readable instructions, data structures, program modules, and other data for computer 1100. Although the exemplary environment described herein employs a hard disk 1128, a removable magnetic disk 1132 and a removable optical disk 1136, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 1128, magnetic disk 1132, optical disk 1136, ROM 1108, or RAM 1110, including, by way of example, and not limitation, an operating system 1114, one or more application programs 1116 (e.g., multimedia application program 1124), other program modules 1118, and program data 1120. Some of the application programs can be configured to present a user interface (UI) that is configured to allow a user to interact with the application program in some manner using some type of input device. This UI is typically a visual display that is capable of receiving user input and processing that user input in some way. Such a UI may, for example, comprise one or more buttons or controls that can be clicked on by a user.

Continuing with FIG. 11, a user may enter commands and information into computer 1100 through input devices such as keyboard 1138 and pointing device 1140 (such as a "mouse"). Other input devices may include a audio/video input device(s) 1153, a microphone, joystick, game pad, satellite dish, serial port, scanner, or the like (not shown). These and other input devices are connected to the processing unit(s) 1102 through input interface(s) 1142 that is coupled to bus 1106, but may be connected by other interface and bus structures, such as a parallel port, game port, or a universal serial bus (USB).

A monitor 1156 or other type of display device is also connected to bus 1106 via an interface, such as a video adapter 1144. In addition to the monitor, personal computers typically include other peripheral output devices (not shown), such as speakers and printers, which may be connected through output peripheral interface 1146.

Computer 1100 may operate in a networked environment using logical connections to one or more remote computers, such as a remote computer 1150. Remote computer 1150 may include many or all of the elements and features described herein relative to computer 1100.

As shown in FIG. 11, computing system 1100 can be communicatively coupled to remote devices (e.g., remote computer 1150) through a local area network (LAN) 1151 and a general wide area network (WAN) 1152. Such networking environments are commonplace in offices, enterprise-wide computer networks, intranets, and the Internet.

When used in a LAN networking environment, the computer 1100 is connected to LAN 1151 through a suitable network interface or adapter 1148. When used in a WAN networking environment, the computer 1100 typically includes a modem 1154 or other means for establishing communications over the WAN 1152. The modem 1154, which may be internal or external, may be connected to the system bus 1106 via the user input interface 1142, or other appropriate mechanism.

In a networked environment, program modules depicted relative to the personal computer 1100, or portions thereof, may be stored in a remote memory storage device. By way of example, and not limitation, FIG. 11 illustrates remote application programs 1116 as residing on a memory device of remote computer 1150. It will be appreciated that the network connections shown and described are exemplary and other means of establishing a communications link between the computers may be used.

CONCLUSION

Compared to other approaches, the inventive approach described attempts to understand and present a web page in accordance with the presentation intentions of its author through the WIPS analysis. Once understood, web page presentation design, re-authoring and the content adaptation are readily and satisfactorily performed. The described methods and systems are advantageously adaptable to the different web pages of various websites because of the general nature of the approach. That is, the described embodiments can be based on analysis of the object functional properties and categories in conjunction with an analysis of the layout and logic structures of a web page. As a result, the methods are not only able to handle HTML based websites, but can also be easily extended to other web environments such as DHTML based websites (as set forth in the W3C).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A web information presentation structure method comprising:
    analyzing one or more functions associated with a first web page on the basis of:
        a layout structure of each said function, the layout structure is determined by steps comprising:

grouping one or more objects associated with the first web page into a shape that contains one said function of the one or more functions; and separating each said shape from the other shapes by a separator, the separating comprising:
  inserting blanks between the shapes;
  projecting each of the shapes onto two perpendicular axes;
  quantifying the projections along each said axis; and
  identifying each said separator as being normal to each section along each said axis where the quantity of the projections is less than a predetermined threshold; and a logic structure of each said function; and displaying a second web page having a different content layout derived as a result of said analyzing the first web page.

2. The method as defined in claim 1, wherein:
the logic structure of each said function is determined by the step comprising determining a position on the first web page for each said shape.

3. The method as defined in claim 2, wherein:
each said shape is a rectangle having sides parallel or normal to that of the other rectangles and to the separators;
each said function is selected from the group consisting of decoration, interaction, navigation, information, and a mixture that includes interaction plus navigation or information;
the position on the first web page for each said shape is selected from the group consisting of a header, a footer, a left region, a right region, and a body.

4. The method as defined in claim 2, wherein the first web page has a layout style different from that of the second web page.

5. The method as defined in claim 1, wherein the layout structure of each said function is determined by steps comprising:
  configuring each said function into a rectangle;
  projecting each rectangle normally onto each of perpendicular axes; and
  determining one or more separators that are each normal to the axes as a function of the sum of the projections on each axis.

6. The method as defined in claim 1, wherein the layout structure of each said function is determined by steps comprising:
  configuring each said function into a rectangle; and
  determining the position of each rectangle with respect to the first$_{13}$ web page.

7. The method as defined in claim 6, wherein the position is selected from the group consisting of a header, a footer, a left region, a right region, and a body.

8. The method as defined in claim 1, wherein said analyzing comprises generating one or more function-based object models that represent objects comprising the first web page.

9. The method as defined in claim 8, wherein said generating comprises:
  identifying one or more Basic Objects associated with the first web page, Basic Objects comprising an information body that cannot be further divided; and
  grouping a set of said one or more Basic Objects into respective Composite Objects associated with the first web page, Composite Objects comprising objects that contain other objects and that achieve one said function.

10. The method as defined in claim 9, wherein said displaying comprises:
  positioning each said Composite Object on the second web page on the basis of the corresponding function achieved thereby as determined from the logic structure of each said function; and
  identifying visual separators between adjacent Composite Objects as determined from the layout structure of each said function.

11. One or more computer-readable media having computer-readable instructions thereon which, when executed by one or more processors, cause the one or more processors to implement the method of claim 1.

12. A web content information presentation structure method comprising:
  detecting objects (Basic Objects) comprising a first web page designed for display on a first device;
  grouping the detected objects (Composite Objects) into shapes each having an area; deriving a layout structure of the first web page by:
    quantifying a normal projection from each said shape onto two axes normal one to another;
    summing the quantified projections along each said axis;
    identifying one or more separators (φ) normal to each said axis from the sum of the quantified projections along each said axis; and
    quantifying (δ), using the identified one or more separators, the distance between each said shapes and other shapes;
  deriving a logic structure of the first web page by:
    generating one or more function-based object models (f(O)) representing the objects in each said shape; and
    deriving a position (p(O)) on the fist web page for each said shape with respect to the other shapes;
  mapping onto a second web page for display on a second device using:
    the identified one or more separators; and
    each said shape using the respective quantified distance from the other shapes and the respective position with respect to the first web page;
  displaying the second web page.

13. The method as defined in claim 12, wherein said detecting objects comprises:
  identifying one or more Basic Objects associated with the first web page, Basic Objects comprising an information body that cannot be further divided; and
  identifying one or more Composite Objects associated with the first web page, Composite Objects comprising objects that contain other objects.

14. The method as defined in claim 12, wherein each said function-based object model is selected from the group consisting of decoration, interaction, navigation, information, and a mixture that includes interaction plus navigation or information.

15. The method as defined in claim 12, wherein the position on the first web page is selected from the group consisting of a header, a footer, a left region, a right region, and a body.

16. The method as defined in claim 12, wherein each said shape is a rectangle.

17. The method as defined in claim 12, wherein the first web page has a layout style different from that of the second web page.

18. One or more computer-readable media having computer-readable instructions thereon which, when executed by one or more processors, cause the one or more processors to implement the method of claim 12.

19. A web information presentation structure method comprising:
   processing a first web page designed for display on a first device with boundaries to provide multiple different functions associated with the web page, individual functions being contained in an individual two-dimensional shape on the first web page, each individual shape having:
      a weight of a normal projection onto each of a pair of axes normal one to the other;
      a position with respect to the boundaries of the first web page; and
      a distance from the other individual shapes;
   detecting separators between adjacent said shapes from the combined weights of the projections of the shapes onto the pair of axes, the detecting comprising:
   inserting blanks between the shapes;
   projecting each of the shapes onto two perpendicular axes;
   quantifying the projections along each said axis; and
   identifying each said separator as being normal to each section along each said axis where the quantity of the projections is less than a predetermined threshold; and
   mapping onto a second web page for display on a second device:
      the detected separators; and
      each said shape as a function of the respective distance from other shapes and the respective position with respect to the first web page;
   displaying the second web page.

20. The method as defined in claim 19, wherein each said function is selected from the group consisting of decoration, interaction, navigation, information, and a mixture that includes interaction plus navigation or information.

21. The method as defined in claim 19, wherein the position with respect to the first web page is selected from the group consisting of a header, a footer, a left region, a right region, and a body.

22. The method as defined in claim 19, wherein each said shape is a rectangle.

23. The method as defined in claim 19, wherein the first web page has a layout style different from that of the second web page.

24. One or more computer-readable media having computer-readable instructions thereon which, when executed by one or more processors, cause the one or more processors to implement the method of claim 19.

25. A web content information presentation structure method comprising:
   analyzing one or more functions associated with a first web page having a first layout style by generating one or more function-based object models that represent objects comprising the web page, individual objects comprising:
      one or more Basic Objects associated with the web page, Basic Objects comprising an information body that cannot be further divided, said one or more Basic Objects being configured to perform one or more of the following functions: (1) providing semantic information, (2) navigating to other objects, (3) providing a visual effect on the web page, and (4) enabling user interaction; and
      one or more Composite Objects associated with the web page, Composite Objects comprising objects that contain other objects, said one or more Composite Objects having a clustering function that is associated with a design of the web page; and
   combining two or more of the objects into rectangles, individual rectangles having one or more properties relating to:
      a weight of a normal projection therefrom onto each of a pair of normal axes; and
      a position ($p(O)$) with respect to the first web page and selected from the group consisting of a header, a footer, a left region, a right region, and a body;
      a function-based object model ($f(O)$) representing the objects therein and selected from the group consisting of decoration, interaction, navigation, information, and a mixture that includes interaction plus navigation or information;
   deriving one or more separators between adjacent shapes from a sum of the weights of the projections along each said axis, each said separator being normal to one of the axes;
   measuring the distance between respective said shapes using the one or more separators;
   mapping to a second web page using a second layout style:
      the separators; and
      each said rectangle using:
         the position ($p(O)$) thereof; and
         the distance thereof from the other shapes; and
         displaying the second web page.

26. The method as defined in claim 25, wherein the individual objects can have a clustering relationship property pertaining to a relationship among any root children of an object.

27. The method as defined in claim 25, wherein the individual objects can have a presentation relationship property pertaining to a presentation order associated with any root children of an object.

28. One or more computer-readable media having computer-readable instructions thereon which, when executed by one or more processors, cause the one or more processors to implement the method of claim 25.

29. A method of web information presentation comprising:
   detecting a layout structure of a first web page designed for display on a first device as a function of objects (O), horizontal and vertical separators ($\phi$), and spatial relationships ($\delta$) by steps comprising:
   identifying objects (O) in the first web page;
   identifying horizontal and vertical separators ($\phi$) between the objects (O) comprising:
      dividing the objects into a plurality of separate rectangles based upon the relative position of, and the function accomplished by, each said object with respect to the other objects;
      projecting each rectangle normally onto each of perpendicular axes; and
      determining the horizontal separators ($\phi$) and the vertical separators ($\phi$) between the objects (O) as a function of the sum of the projections on each axis;
   identifying a spatial relationship ($\delta$) between each said object (O):

the at least one of horizontal and vertical separators in φ between the objects in O; and
the other objects in O;
detecting a logic structure of the first web page for each said object (O) by steps comprising:
identifying a functional property f(O) with respect to the first web page and selected from the group consisting of decoration, interaction, navigation, information, and a mixture that includes interaction plus navigation or information; and
identifying the positional property p(O) of each said object (O) and selected from the group consisting of information a header, a footer, a left region, a right region, and a body;
displaying the layout structure and the logic structure onto a second web page for display on a second device.

30. The method as defined in claim 29, wherein the identifying the functional property f(O) of each said object comprises identifying an overall function accomplished by the objects in each rectangle and selected from the group consisting of decoration, interaction, navigation, information, and a mixture that includes interaction plus navigation or information.

31. The method as defined in claim 29, wherein the identifying the positional property p(O) of each said object comprises identifying the position of each rectangle with respect to the web page and selected from the group consisting of a header, a footer, a left region, a right region, and a body.

32. One or more computer-readable media having computer-readable instructions thereon which, when executed by one or more processors, cause the one or more processors to implement the method of claim 29.

33. A web content adaptation method comprising:
receiving multiple web pages that are configured for display on a first device type;
processing the multiple web pages to provide multiple different objects associated with the web pages, individual objects having one or more properties relating to functions of the individual object;
analyzing the functions of the individual objects associated with each said web page on the basis of a layout structure of each said function and on the basis of a logic structure of each said function, wherein:
the layout structure of each said function is analyzed by:
grouping one or more objects associated with the web page into a shape that contains one said function of the one or more functions; and
separating each said shape from the other shapes by a separator comprising:
inserting blanks between the shapes;
projecting each of the shapes onto two perpendicular axes;
quantifying the projections along each said axis; and
identifying each said separator as being normal to each section along each said axis where the quantity of the projections is less than a predetermined threshold;
the logic structure of each said function is analyzed by determining a position on the web page for each said shape;
applying one or more rules to the objects sufficient to provide multiple different web pages, individual web pages of said multiple web pages being associated with two or more of said multiple different web pages, each said different web page having a different layout that is:
based on said analyzing; and
configured for display on a second device type that is different from the first device type.

34. The method as defined in claim 33, further comprising presenting the multiple different web pages on the second device based on said analyzing.

35. The method as defined in claim 33, wherein:
each said shape is a rectangle having sides parallel or normal to that of the other rectangles and to the separators;
each said function is selected from the group consisting of decoration, interaction, navigation, information, and a mixture that includes interaction plus navigation or information;
the position on each said web page for each said shape is selected from the group consisting of a header, a footer, a left region, a right region, and a body.

36. The method as defined in claim 33, wherein said analyzing further comprises generating one or more function-based object models that represent objects comprising the web page.

37. The method as defined in claim 36, wherein said generating comprises:
identifying one or more Basic Objects associated with the web page, Basic Objects comprising an information body that cannot be further divided; and
grouping a set of said one or more Basic Objects into respective Composite Objects associated with the web page, Composite Objects comprising objects that contain other objects and that achieve one said function.

38. The method as defined in claim 37, wherein said presenting comprises:
positioning each said Composite Object on the web page on the basis of the corresponding function achieved thereby as determined from the logic structure of each said function; and
identifying visual separators between adjacent Composite Objects as determined from the layout structure of each said function.

39. The method of claim 33, wherein the individual objects can have a presentation property that defines a way in which the object is presented.

40. The method of claim 33, wherein the individual objects can have a semanteme property associated with the content of an object.

41. The method of claim 33, wherein the individual objects can have a decoration property pertaining to the extent to which an object serves to decorate a web page.

42. The method of claim 33, wherein the individual objects can have a hyperlink property pertaining to an object to which another object points via a hyperlink.

43. The method of claim 33, wherein the individual objects can have a interaction property pertaining to an interaction method of an object.

44. The method of claim 33, wherein the individual objects can have a clustering relationship property pertaining to a relationship among any root children of an object.

45. The method of claim 33, wherein the individual objects can have a presentation relationship property pertaining to a presentation order associated with any root children of an object.

46. The method of claim 33, wherein said processing comprises defining a representation of an object that includes any children of said object.

47. The method of claim 46, wherein said assigning comprises using a rule-based decision tree to ascertain a category for said one or more objects.

48. The method of claim 46, wherein said assigning comprises assigning a category from a set of object categories comprising: (1) an information object that presents content information, (2) a navigation object that provides a navigation function, (3) an interaction object that provides for user interaction, (4) a decoration object that serves a decoration function, (5) a special function object that performs a defined function, and (6) a page object that is associated with presentation of related information.

49. The method of claim 33, wherein said processing comprises assigning a category to one or more objects.

50. The method as defined in claim 33, wherein the layout structure of each said function is further analyzed by:
configuring each said function into a rectangle;
projecting each rectangle normally onto each of perpendicular axes; and
determining one or more separators that are each normal to the axes as a function of the sum of the projections on each axis.

51. The method as defined in claim 33, wherein the layout structure of each said function is further analyzed by:
configuring each said function into a rectangle; and
determining the position of each rectangle with respect to the web page.

52. The method as defined in claim 51, wherein the position is selected from the group consisting of a header, a footer, a left region, a right region, and a body.

53. One or more computer-readable media having computer-readable instructions thereon which, when executed by one or more processors, cause the one or more processors to implement the method of claim 33.

54. A computer architecture for use in adapting web content for display on a computing device implemented at least in part by a computing device, the architecture comprising:
an analysis module for:
receiving multiple web pages that are configured for display on a first device type;
processing the multiple web pages to provide multiple different objects associated with the web pages, individual objects having one or more properties relating to functions of the individual object;
analyzing the functions of the individual objects associated with each said web page on the basis of a layout structure of each said function and on the basis of a logic structure of each said function, wherein:
the layout structure of each said function based on a projection profile of one or more objects associated with the web page is analyzed by:
grouping one or more objects associated with the web page into a shape that contains one said function of the one or more functions; and
separating each said shape from the other shapes by a separator, the separating comprising:
inserting blanks between the shapes;
projecting each said shape onto two perpendicular axes;
quantifying the projections along each said axis; and
identifying each said separator has being normal to each section along each said axis where the quantity of the projections is less than a predetermined threshold; and
the logic structure of each said function is analyzed by determining a position for each said shape on each said web pages;
generating, for each said web page, one or more function-based object models that represent objects comprising each said web page;
one or more rules modules containing rules that are to be used to adapt content contained in each said webpage; and
a content adaptation module configured to process the one or more function-based object models in accordance with one or more rules contained in the one or more rules modules to produce multiple different web pages, individual web pages of said multiple web pages being associated with two or more of said multiple different web pages, each said different web page having a different layout that is:
based on said analyzing; and
configured for display on a second device type that is different from the first device type.

55. The architecture as defined in claim 54, further comprising a presentation module for receiving said multiple different web pages produces by the content adaptation module and for presenting the multiple different web pages on the second device based on the rules of the one or more rules modules.

56. The architecture as defined in claim 54, wherein:
each said shape is a rectangle having sides parallel or normal to that of the other rectangles and to the separators;
each said function is selected from the group consisting of decoration, interaction, navigation, information, and a mixture that includes interaction plus navigation or information;
the position on each said web page for each said shape is selected from the group consisting of a header, a footer, a left region, a right region, and a body.

57. The architecture as defined in claim 55, wherein said generating comprises:
identifying one or more Basic Objects associated with the web page, Basic Objects comprising an information body that cannot be further divided; and
grouping a set of said one or more Basic Objects into respective Composite Objects associated with the web page, Composite Objects comprising objects that contain other objects and that achieve one said function.

58. The architecture as defined in claim 57, wherein said presenting comprises:
positioning each said Composite Object on the web page on the basis of the corresponding function achieved thereby as determined from the logic structure of each said function; and
identifying visual separators between adjacent Composite Objects as determined from the layout structure of each said function.

59. The architecture of claim 54, wherein the individual objects can have a presentation property that defines a way in which the object is presented.

60. The architecture of claim 54, wherein the individual objects can have a semanteme property associated with the content of an object.

61. The architecture of claim 54, wherein the individual objects can have a decoration property pertaining to the extent to which an object serves to decorate a web page.

62. The architecture of claim 54, wherein the individual objects can have a hyperlink property pertaining to an object to which another object points via a hyperlink.

63. The architecture of claim 54, wherein the individual objects can have a interaction property pertaining to an interaction method of an object.

64. The architecture of claim 54, wherein the individual objects can have a clustering relationship property pertaining to a relationship among any root children of an object.

65. The architecture of claim 54, wherein the individual objects can have a presentation relationship property pertaining to a presentation order associated with any root children of an object.

66. The architecture of claim 54, wherein said processing comprises defining a representation of an object that includes any children of said object.

67. The architecture of claim 54, wherein said processing comprises assigning a category to one or more objects.

68. The architecture of claim 67, wherein said assigning comprises using a rule-based decision tree to ascertain a category for said one or more objects.

69. The architecture of claim 67, wherein said assigning comprises assigning a category from a set of object categories comprising: (1) an information object that presents content information, (2) a navigation object that provides a navigation function, (3) an interaction object that provides for user interaction, (4) a decoration object that serves a decoration function, (5) a special function object that performs a defined function, and (6) a page object that is associated with presentation of related information.

70. The architecture as defined in claim 54, wherein said analyzing further comprises generating one or more function-based object models that represent objects comprising the web page.

* * * * *